3,143,461
METHODS FOR TREATING BABESIASIS
Samuel Sidney Berg, Ilford, Essex, England, assignor to May & Baker Limited, Dagenham, England, a British company
No Drawing. Filed Jan. 29, 1962, Ser. No. 169,603
Claims priority, application Great Britain Dec. 15, 1958
2 Claims. (Cl. 167—53)

This invention relates to pharmaceutical compositions containing diamidines of therapeutic utility.

According to the present invention therein are provided pharmaceutical compositions which comprise a pharmaceutical carrier and, as active ingredient, a diamidine conforming to the formula:

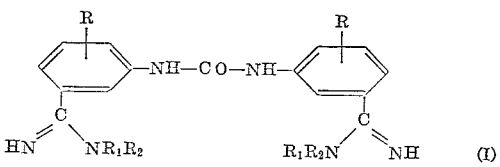

(wherein R is meta or para to the amidino group and represents a hydrogen or halogen atom, or a lower alkyl, lower alkoxy, nitro, or amino ($NH_2$) group, and $R_1$ and $R_2$ are the same or different each representing a hydrogen atom or a lower alkyl group) and their acid addition salts having therapeutically acceptable anions. The word "lower" as applied herein to alkyl and alkoxy groups means that the group in question contains not more than four carbon atoms.

The diamidines of Formula I are useful in the treatment of protozoal diseases, especially babesiasis. In this regard it is known that 4,4'-diamidinodiphenylurea exhibits slight activity against veterinary trypanosomiasis (Fulton and Yorke, Ann. Trop. Med. Parasit., 1942, 36, 131) but it is completely inactive against B. rodhaini in mice. The diamidines used in the present invention have high activity against B. rodhaini in mice and B. bovis in calves, an activity which is, therefore, completely unexpected. Compounds which possess this activity to an outstanding degree are those in which each symbol R represents a hydrogen atom; in particular, 3,3'-diamidinodiphenylurea and 3,3'-di(N-methylamidino)diphenylurea. The compounds of the invention are, furthermore, quick acting and of low toxicity.

According therefore to a further feature of the invention there is provided a process for the treatment of an animal suffering from babesiasis which comprises administering to the animal a diamidine of Formula I or a said acid addition salt thereof, or a said pharmaceutical composition containing the same, in quantity sufficient to effect an alleviation or cure of the babesiasis.

The compounds of general Formula I may be prepared by a process which comprises reacting a compound of the general formula:

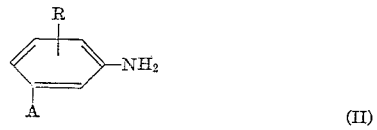

(wherein R is as hereinbefore defined, and A is a cyano or amidino group of the formula —$C(:NH)NR_1R_2$ in which $R_1$ and $R_2$ are as hereinbefore defined), or an acid addition salt thereof, with phosgene or 3,5-dimethylpyrazole-1-carbonamide and, where A represents a cyano group, converting the cyano group into an amidino group of formula —$C(:NH)NR_1R_2$ by known methods. By the expression "known methods" as used in this specification and accompanying claims is meant methods heretofore employed or described in the chemical literature.

In the aforesaid process when phosgene is a reactant and A in the reactant of Formula II is (a) the cyano group, the reaction is preferably carried out in the presence of an acid binding agent such as pyridine and in an inert solvent or (b) an amidino group

—$C(:NH)NR_1R_2$ the reaction is preferably effected either in a basic solvent such as pyridine or in an inert solvent in the presence of an acid binding agent, such as an alkali metal carbonate, bicarbonate or acetate, using the amidine in the form of an acid addition salt, e.g., hydrochloride.

In the aforesaid process when 3,5-dimethylpyrazole-1-carbonamide is a reactant, the reaction is preferably effected at an elevated temperature in a hydroxylic solvent such as 2-ethoxyethanol.

Conversion of the cyano group in a resultant product into an amidino group —$C(:NH)NR_1R_2$ may be effected by known methods, for example, by successive treatment with hydrogen chloride and ammonia or an amine conforming to the formula $R_1R_2NH$ (wherein $R_1$ and $R_2$ are as hereinbefore defined).

The diamidines of general Formula I in which either or both of $R_1$ and $R_2$ represent lower alkyl groups may also be prepared by alkylating a corresponding compound in which $R_1$ and $R_2$ represent hydrogen atoms by known methods for the alkylation of amidines, for example, by reaction with alkyl halides, sulphates or toluene-p-sulphonates.

For therapeutic purposes the bases of the present invention will normally be administered in the form of one of their acid addition salts, it being understood that only those such salts should in practice be employed as contain anions that are relatively innocuous to the animal organism when used in therapeutic doses so that the beneficial physiological properties inherent in the parent compound are not vitiated by side-effects ascribable to those anions. Such anions are herein referred to as therapeutically acceptable anions. Suitable salts include hydrohalides, for example, hydrochlorides, isethionates, 8-chlorotheophyllinates, phosphates, nitrates, sulphates, maleates, fumarates, citrates, tartrates, methane sulphonates and ethane disulphonates. The hydrohalides and isethionates are salts which are preferred.

The following examples illustrate the production of diamidines of general Formula I:

*Example I* m-Aminobenzonitrile (50 g.) in anhydrous pyridine (200 ml.) was treated with a solution of phosgene (15 ml.) in anhydrous toluene (100 ml.) over 10 minutes with mechanical stirring. The red solution was heated for 0.5 hour on the steam bath, cooled, and added to water (2 litres). The pale grey precipitate was filtered off, washed with ether, and crystallised from ethanol (250 ml.). N,N'-di(m-cyanophenyl)urea separated as grey prisms, M.P. 205–206° C.

A suspension of N,N'-di(m-cyanophenyl)urea (42 g.) in anhydrous chloroform (420 ml.), containing anhydrous ethanol (70 ml.), was saturated with anhydrous hydrogen chloride at 0–5° C. After setting aside for 2 hours, a clear solution was obtained, which began to crystallise. After a week, the crystals were filtered off, washed well with anhydrous ether, and dried over calcium chloride. The iminoether hydrochloride so obtained (72 g.) was added to saturated anhydrous ethanolic ammonia (720 ml.), and the suspension heated at 55–60° C. for 6 hours. Solution was obtained after an hour, followed by crystallisation of the product. After cooling to 20° C. the crystals were filtered off, and recrystallised from 2 N hydrochloric acid (300 ml.). 3,3'-diamidinodiphenylurea dihydrochloride monohydrate separated as white prisms, M.P. 286° C. (decomp.).

Example II

Anhydrous hydrogen chloride was passed into a mechanically stirred fine suspension of N,N'-di(m-cyanophenyl)urea (55 g.) (prepared as described in Example I), anhydrous chloroform (550 ml.) and anhydrous ethanol (91.5 ml.) at 0–5° C. The saturated solution was set aside at room temperature, crystallisation commencing after a few hours. After 5 days, the iminoether hydrochloride formed was filtered off, washed with anhydrous ether, and dried over calcium chloride. The crystals (90 g.) were dissolved in ice-water (900 ml.) and the solutions was basified at 0–10° C. with 2 N sodium hydroxide in the presence of chloroform (500 ml.). The chloroform extract was separated, mixed with a chloroform wash of the alkaline liquor, washed with saturated brine, and dried over anhydrous sodium sulphate. After filtering off the drying agent, the solution was concentrated at 15–25 mm. on a bath at 35–40° C., and the residual gum (79.2 g.) dissolved in ethanol (792 ml.). Ammonium isethionate (60 g.) in water (120 ml.) was added and the solution was heated in a bath at 60° C. for 8 hours. Crystallisation occurred during the later stages of the reaction. The reaction mixture was cooled to 5° C., and the crystals were filtered off, washed with acetone, and dried at 90° C. Crystallisation from methanol-acetone gave 3,3'-diamidinodiphenylurea di-isethionate as white needles, M.P. 209° C., the melt decomposing at 256° C.

Example III

A fine suspension of m-aminobenzamidine monohydrochloride (3.65 g.) in anhydrous pyridine (15 ml.) was treated at 5–10° C. with a solution of phosgene (0.75 ml.) in anhydrous toluene (5 ml.). The reaction mixture was heated on a steam bath for half an hour, cooled to 25° C., and the liquor decanted. Treatment of the residual gum with ethanol and ether yielded a sticky solid. Two crystallisations from 2 N hydrochloric acid gave 3,3'-diamidinodiphenylurea dihydrochloride sesquihydrate, decomposing at 286° C.

Example IV

A solution of m-aminobenzamidine monohydrochloride (3.45 g.) and 3:5-dimethylpyrazole-1-carbonamide (1.4 g.) (Scott, O'Donovan, Kennedy and Reilly, J. Org. Chem., 1957, 22, 821) in β-ethoxyethanol (7 ml.) was refluxed for 5 hours. After cooling to 25° C., the solid which had separated during the reaction was filtered off, washed with acetone, and dried at 50° C. Crystallisation from 2 N hydrochloric acid gave 3,3'-diamidinodiphenylurea dihydrochloride sesquihydrate, decomposing at 286° C.

Example V

Proceeding as described in Example I, 3-amino-4-methoxybenzonitrile (Blanksma and Petri, Rec. Trav. Chim., 1947, 66, 365) was reacted with phosgene to give N,N'-di(3-cyano-6-methoxyphenyl)urea as pale yellow needles, M.P. 315–316° C., which was converted by the procedure described in Example I to 3,3'-diamidino-6,6'-dimethoxydiphenylurea dihydrochloride monohydrate as white needles from N hydrochloric acid, decomposing at 285–286° C.

Example VI

Proceeding as described in Example I, 3-amino-4-chlorobenzonitrile was reacted with phosgene to give N,N'-di(6-chloro-3-cyanophenyl)urea as white needles from dimethylformamide (decomposing at 330° C.) which was converted by the procedure described in Example I to 3,3'-diamidino-6,6'-dichlorodiphenylurea dihydrochloride monohydrate as white prisms from 2 N hydrochloric acid, decomposing at 280–282° C.

The 3-amino-4-chlorobenzonitrile used as starting material was prepared as follows:

Reduced iron (25 g.) was added slowly to a boiling solution of 4-chloro-3-nitrobenzonitrile (25 g.) (Le Fevre and Turner, J. Chem. Soc., 1927, 1118) in 50% v./v. acetic acid (380 ml.). After the vigorous reaction had subsided, the reaction mixture was heated on the steam bath for 15 minutes, and filtered hot. The residue was extracted with boiling 50% v./v. acetic acid (2 x 100 ml.) and the combined filtrate and extracts were added to water (200 ml.). After cooling to 5° C., the precipitate was filtered off, washed with 2 N acetic acid and water. Crystallisation from aqueous ethanol gave 3-amino-4-chlorobenzonitrile as white needles, M.P. 93–94° C.

Example VII

A suspension of N,N'-di(m-cyanophenyl)urea (11.6 g.) (prepared as described in Example I) in anhydrous chloroform (116 ml.) containing anhydrous ethanol (19.4 ml.) was saturated with anhydrous hydrogen chloride at 0–5° C. After setting aside for 2 hours a clear solution was obtained, which began to crystallise. After a week, the crystals were filtered off, washed well with anhydrous ether, and dried over calcium chloride. The iminoether hydrochloride so obtained (20 g.) was dissolved in water (200 ml.) and the solution was basified at 0.10° C. with 2 N sodium hydroxide. The base which separated was extracted with chloroform, and the chloroform extracts were mixed and dried over anhydrous sodium sulphate. After filtration from the drying agent the chloroform was distilled off from a bath at 30–35° C. under reduced pressure. The residual gum (16.9 g.) was dissolved in anhydrous ethanol (200 ml.) and methylamine hydrochloride (6.6 g.) added. The solution was heated at 55–60° C. for 8 hours, and then concentrated under reduced pressure. 3 N hydrochloric acid (300 ml.) was added to the residual gum, and the mixture heated to a solution. On cooling, 3,3'-di-(N-methylamidino)diphenylurea dihydrochloride sesquihydrate separated as white needles which decomposed from 210° C., finally melting at 273–274° C.

Similarly prepared were:

3,3'-di(N-ethylamidino)diphenylurea dihydrobromide monohydrate, decomposing at 302–305° C.;

3,3'-di(N,N-dimethylamidino)diphenylurea dihydrobromide hydrate, decomposing at 300–302° C.

The present invention provides pharmaceutical compositions comprises one or more of the compounds of Formula I, or of an acid addition salt thereof, and a significant amount of a pharmaceutical carrier which may be either a solid material or a liquid. In veterinary practice the compounds of the present invention will normally be administered by intramuscular injection in consequence of which the preferred formulations are those of the kind suitable for parenteral administration.

Preparations for parenteral administration are preferably in the form of sterile solutions in water of readily soluble salts. However, sterile solutions in other suitable solvent media can be employed as also may sterile suspensions of sparingly soluble salts in water, oil or other inert solvents such as propylene glycol, with or without the addition of soluble or insoluble diluents and/or solid or liquid excipients.

Preparations for oral ingestion can be liquids or solids or any combination of these forms, such as solutions, suspensions, syrups, elixirs, emulsions, powders or tablets. Pharmaceutical preparations for administration of the active therapeutic agents in unit dose form can take the form of compressed powders (or tablets) or of a powder enclosed in a suitable capsule or absorbable material such as gelatin. These compressed powders (or tablets) can take the form of the active materials admixed with suitable excipients and/or diluents such as starch, lactose, stearic acid, magnesium stearate or dextrin.

In yet a further embodiment, the active material may, as such or in the form of a diluted composition, be put in powder packets and employed as such.

The percentage of active ingredient in the compositions of the invention may be varied, it being necessary that it should constitute a proportion such that a suitable dosage shall be obtained. Obviously several unit dosage forms may be administered at about the same time. A suitable dosage for the treatment of, for example, bovine redwater, i.e., *B. bovis*, is 5 mg. of diamidine salt per kilogram of weight of the animal to be treated.

The following examples illustrate pharmaceutical compositions according to the invention.

Example VIII

An injectable solution of the formula:

3,3′-diamidinodiphenylurea dihydrochloride monohydrate_____ 10 g.
Distilled water_____ Up to 100 ml.

was prepared by dissolving the diamidine salt in the distilled water. The solution was filtered and filled into ampoules which were sterilised in an autoclave.

Example IX

An injectable solution of the formula:

3,3′-diamidinodiphenylurea diisethionate_ 50 g.
Distilled water_____ Up to 100 ml.

was prepared by dissolving the diamidine salt in the distilled water. The solution was passed through a bacteria-retaining filter and filled into ampoules which were sterilised by heating in a steam oven for 30 minutes.

Example X

An injectable solution of the formula:

3,3′-diamidinodiphenylurea diisethionate_ 50 g.
Chlorocresol_____ 0.2 g.
Distilled water_____ Up to 100 ml.

was prepared by dissolving the diamidine salt in the distilled water containing the chlorocresol and sterilising the solution by passing through a bacteria-retaining filter, filling into ampoules and heating in a steam oven for 30 minutes.

Tests carried out on animals have demonstrated the remarkable superiority of the diamidines of the Formula I as compared with known compounds of some chemical analogy. Thus, for example, tests using mice infected with *Babesia rodhaini* have shown that the 3,3-diamidine of Formula I in which R, $R_1$ and $R_2$ are all hydrogen is effective in establishing a cure within the framework of the tests used whereas the corresponding 4,4′-diamidine is completely inactive against this organism. Further, tests on calves infected with *Babesia bovis*, and accordingly suffering from bovine redwater, showed that the 3,3′-diamidine compound of Formula I (R=$R_1$=$R_2$=H) at 5 mg./kg. bodyweight was as effective as 1 mg./kg. of quinuronium sulphate (the prior art compound used for this complaint at 1 mg./kg. recommended dose), is quicker acting and causes, even at 5 mg./kg. dosage, none of the toxic symptoms associated with quinuronium sulphate at 1 mg./kg.

This application is a continuation-in-part of application Serial No. 858,591, filed December 10, 1959, now abandoned.

I claim:

1. A process for the treatment of a domestic animal suffering from babesiasis which comprises administering to the animal a member of the class consisting of diamidines of the formula:

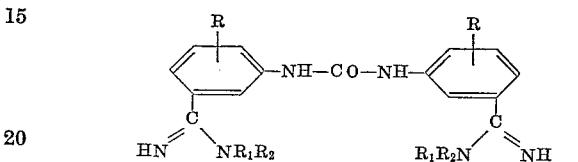

wherein R is in one of the positions meta and para to the amidino group shown in the formula and represents a member of the class consisting of hydrogen and halogen atoms, and lower alkyl, lower alkoxy, nitro and $NH_2$, and $R_1$ and $R_2$ represent members of the class consisting of the hydrogen atom and lower alkyl, and their acid addition salts having therapeutically acceptable anions, the quantity of said compound administered being sufficient to alleviate the babesiasis.

2. A process for the treatment of a domestic animal suffering from babesiasis which comprises administering to the animal a pharmaceutical composition which comprises a pharmaceutical carrier and, as active ingredient, a member of the class consisting of diamidines of the formula:

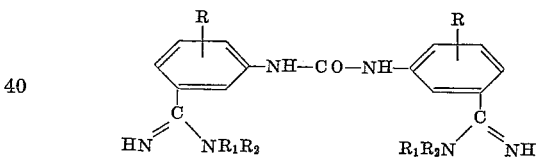

wherein R is in one of the positions meta and para to the amidino group shown in the formula and represents a member of the class consisting of hydrogen and halogen atoms, and lower alkyl, lower alkoxy, nitro and $NH_2$, and $R_1$ and $R_2$ represent members of the class consisting of the hydrogen atom and lower alkyl, and their acid addition salts having therapeutically acceptable anions, the quantity of said compound administered being sufficient to alleviate the babesiasis.

References Cited in the file of this patent

Peyron: Chem. Abst., vol. 48, 1954, pages 10632 and 10633c.